(12) United States Patent
Haun et al.

(10) Patent No.: US 10,439,662 B2
(45) Date of Patent: Oct. 8, 2019

(54) MOBILE RADIO COMPENSATOR FOR USE IN MOTOR VEHICLES, AND A MOTOR VEHICLE OF THIS KIND

(71) Applicant: KATHREIN SE, Rosenheim (DE)

(72) Inventors: Martin Haun, Rosenheim (DE); Rudolf Weber, Tuntenhausen (DE)

(73) Assignee: Kathrein SE, Rosenheim (DE)

(*) Notice: Subject to any disclaimer, the term of this patent is extended or adjusted under 35 U.S.C. 154(b) by 0 days.

(21) Appl. No.: 16/230,346

(22) Filed: Dec. 21, 2018

(65) Prior Publication Data

US 2019/0199381 A1 Jun. 27, 2019

(30) Foreign Application Priority Data

Dec. 22, 2017 (DE) .......................... 10 2017 131 088

(51) Int. Cl.
*H04B 1/04* (2006.01)
*H04B 1/3822* (2015.01)
(Continued)

(52) U.S. Cl.
CPC ......... *H04B 1/0475* (2013.01); *H04B 1/0057* (2013.01); *H04B 1/3822* (2013.01); *H04B 1/3877* (2013.01); *H04B 2001/0408* (2013.01)

(58) Field of Classification Search
CPC .. H04B 1/0057; H04B 1/0475; H04B 1/3822; H04B 1/3877; H04B 2001/0408
(Continued)

(56) References Cited

U.S. PATENT DOCUMENTS 5,313,658 A * 5/1994 Nakamura ............ H04W 52/52
455/126
9,136,883 B1 * 9/2015 Moher ................. H04B 1/0042
(Continued)

FOREIGN PATENT DOCUMENTS

DE 10 2013 101 590 8/2014
DE 10 2013 207 898 10/2014
(Continued)

OTHER PUBLICATIONS

Harri Holma, et al., "WCDMA for UMTS", Radio Access for Third Generation Mobile Communications, Third Edition, Wiley, Mar. 2006, 4 pages.

*Primary Examiner* — Tan H Trinh
(74) *Attorney, Agent, or Firm* — Nixon & Vanderhye P.C.

(57) ABSTRACT

A mobile radio compensator (1) comprises an adjustable signal-level amplification means (12a, 12b) and a central detection means (13) in order to detect the signal level of the transmission signals. An adjustment and/or control means (14) can adjust a signal amplification, produced by the signal-level amplification means (12a, 12b), of the transmission signals on the basis of the signal level detected by the detection means (13). A decoupling means (15) comprising at least two decoupling signal paths (15a, 15b, 15c) is provided, wherein the decoupling signal paths (15a, 15b, 15c) are connected to a power adding means (19) of which the output (20) is in turn connected to the detection means (13). The decoupling means (15) comprises a filter means (25, 25a, 25b, 25c) which is arranged on or in the at least two decoupling signal paths (15a, 15b, 15c), wherein the passbands ($\Delta f_1, \Delta f_2, \Delta f_3$) for each of the at least two decoupling signal paths (15a, 15b, 15c) differ. The decoupling signal paths (15a, 15b, 15c) comprise an adjustable amplification
(Continued)

means (30*a*, 30*b*, 30*c*), which are alternately switched on and off by the adjustment and/or control means (14).

29 Claims, 3 Drawing Sheets

(51) Int. Cl.
*H04B 1/3877* (2015.01)
*H04B 1/00* (2006.01)

(58) Field of Classification Search
USPC ......... 455/69, 522, 73, 126, 127.2; 375/295, 375/296, 297; 370/252
See application file for complete search history.

(56) References Cited

U.S. PATENT DOCUMENTS

| | | | |
|---|---|---|---|
| 2003/0053552 A1* | 3/2003 | Hongo | H03F 1/3247 375/295 |
| 2005/0105642 A1* | 5/2005 | Muller | H03F 1/3247 375/296 |
| 2006/0142044 A1* | 6/2006 | Sung | H04W 52/42 455/522 |
| 2006/0154685 A1* | 7/2006 | Shin | H04W 52/08 455/522 |
| 2012/0269078 A1* | 10/2012 | Weng | H04W 52/241 370/252 |
| 2013/0090077 A1* | 4/2013 | Rozenblit | H04W 52/52 455/127.2 |
| 2014/0185707 A1* | 7/2014 | Bollmann | H04B 1/0458 375/297 |
| 2014/0233675 A1* | 8/2014 | Bollmann | H04B 1/0475 375/297 |
| 2015/0065061 A1* | 3/2015 | Nakata | H04B 1/10 455/73 |
| 2017/0324431 A1* | 11/2017 | Solan | H04B 1/3877 |
| 2018/0159578 A1* | 6/2018 | Lankes | H04B 1/3877 |

FOREIGN PATENT DOCUMENTS

| | | |
|---|---|---|
| DE | 10 2016 108 206 | 11/2017 |
| EP | 1 841 083 | 10/2007 |

\* cited by examiner

MOBILE RADIO COMPENSATOR FOR USE IN MOTOR VEHICLES, AND A MOTOR VEHICLE OF THIS KIND

This application claims priority to DE 10 2017 131 088.6 filed Dec. 22, 2017, the entire contents of each of which is hereby incorporated by reference.

The invention relates to a mobile radio compensator which is intended for use in motor vehicles and is used to compensate for signal attenuation when transmitting signals from or to a mobile radio device, and to a motor vehicle of this kind.

It is known that mobile radio networks are designed to be cellular in order to have a service that is as full-coverage as possible. A mobile radio cell is convention-ally formed by a base station on which usually stationary mobile radio antennas are mounted.

On account of these antennas of the base station, a corresponding cell is "lit up", with the result that a subscriber that is located within this mobile radio cell and is usually mobile can communicate with the base station and, by means thereof, can have conversations with other subscribers even in other mobile radio networks or in landline networks, for example.

The communication between the base station and mobile radio devices in a mobile radio cell takes place in a known manner using radio waves. As a mobile radio device increasingly approaches the cell boundary of a mobile radio cell, it requires increasingly higher transmission power in order to continue to communicate with the base station. In other words, the mobile phone now has to transmit "louder", i.e. increase its signal level, in order to continue to be "heard".

As the mobile radio device comes ever closer to a base station, the transmission power required, i.e. the signal level, is adjusted down. The mobile phone increasingly communicates "more quietly" with the base station.

A range of provisions governs how the communication between the base station and the mobile radio device takes place. Maximum transmission powers (signal levels) and also minimum transmission powers are generally specified as part of these provisions in a technology-dependent manner. There are different limit values for maximum/minimum signal levels depending on the mobile radio standard (GSM, UMTS, LTE).

The publication "WCDMA FOR UMTS", Third Edition, Harri Holma and Antti Toskala, WILEY (date of publication: March 2016 (reprinted)) discusses how the transmission power of a mobile radio device changes and/or is adjusted, for example. For example, page 55 and page 56 of this book, in the chapter "Power Control", states that the base station instructs the mobile radio device to decrease the transmission power whenever the mobile radio device in a mobile radio cell transmits a signal that is too strong. If the transmission power of the mobile radio device is too low, the mobile radio station instructs the mobile radio device to increase its transmission power again. A corresponding measurement and instruction cycle is executed for example 1500 times per second.

A known, fundamental problem also arises therefrom, whereby (controlled by the base station) the mobile radio devices have to be controlled in terms of their varying distances from the base station in such a way that the signal strengths at the base station are comparably high so that one mobile radio device cannot "drown out" another; in other words, secure communication can thus occur between a base station and all the mobile radio devices in a cell.

If the mobile radio device is not used outdoors, but rather in a motor vehicle for example, it is generally recommended to use a motor vehicle antenna installed outside of the motor vehicle in order for the communication with the base station to occur thereby.

However, this requires the use of a corresponding coupling and line structure via which the transmission signals can be transmitted from the mobile radio device to the motor vehicle antenna, and vice versa, when signals are received. The use of a coupling and line structure of this kind ultimately leads to additional attenuation, however, which is why corresponding transmission signals that are not emitted by the mobile radio device itself, but are emitted via the motor vehicle antenna, have a lower transmission power (lower signal level). In light of this, it is therefore known to connect corresponding amplifier circuits, which are used to compensate for the attenuation of the signal strength.

In this respect, it is generally desirable for the amplifier, i.e. the mobile radio compensator, to compensate for the additional attenuation that is present (which is why said amplifiers are also sometimes referred to as compensators) in such a way that the communication between the motor vehicle external antenna and the base station occurs exactly as if the mobile radio device were used outside of the motor vehicle, outdoors, at the corresponding position within a mobile radio cell, without an amplifier of this kind.

The aim of a mobile radio compensator of this kind, and the associated control thereof, is that the additional attenuation caused by the circuit arrangement, which results in the transmission power being reduced, is compensated for.

Ideally, the mobile radio compensator would compensate for the attenuation caused such that the transmission power at the motor vehicle antenna has exactly the same value as that at which a mobile radio device outdoors, without a mobile radio compensator of this kind, would also communicate with a base station.

In other words, an ideal and thus optimum compensation with respect to signal attenuation when transmitting transmission signals of a mobile radio device occurs when the mobile radio compensator for compensating for signal attenuation transmits, under all operating conditions where possible, above all under the critical operating conditions, and at both great and short distances from the base station, at exactly the same transmission powers at which a mobile radio device outdoors would transmit when transmitting the transmission signals of a mobile radio device. In this process, the above-described limit values for the maximum signal levels must not be exceeded, and it should also be ensured that the limit values for the minimum signal levels are reached.

A mobile radio compensator is also known from DE 10 2013 101 590 A1. Knowledge of the current signal level is required in order to set the amplification to the desired value. For this purpose, a detection means is provided which compares the level with an upper and with a lower threshold value in order to correspondingly actuate an attenuation means on the basis of the detection result such that the transmission signal levels remain in the permitted limit ranges.

The disadvantage of DE 10 2013 207 898 A1 is that the detection means does not allow any differentiation as to which mobile radio bands are currently in operation and which are not, in order to control the amplification means in a targeted manner.

The problem addressed by the present invention is therefore that of providing a mobile radio compensator which makes it possible, in a very simple and cost-effective manner, to establish whether a mobile radio device is sending a transmission signal which ought to be amplified, and which mobile radio band said mobile radio device is using.

This problem is solved by the mobile radio compensator in accordance with the invention according to claim 1, and by the motor vehicle in accordance with the invention which contains a mobile radio compensator of this kind, according to claim 27. Advantageous embodiments of the mobile radio compensator according to the invention are found in the dependent claims.

The mobile radio compensator according to the invention not only allows detection of the mobile radio band which is currently being used, along with the further advantages resulting therefrom, but also implements this detection in a very economical, simple and reliable manner. For this purpose, the mobile radio compensator comprises a mobile radio device connection means and an antenna connection means. The mobile radio device can be connected or coupled by means of the mobile radio device connection means. The mobile radio device can be connected to the mobile radio device connection means in any suitable manner, for example electromagnetically, inductively and/or capacitively or galvanically. An implementation of the coupling falling thereunder would be if a cradle were connected to the mobile radio device connection means, the mobile radio device then communicating wirelessly with the cradle. The antenna connection means of the mobile radio compensator can in turn be (galvanically) connected to an antenna means. The two connection means are electrically interconnected by a signal line that comprises at least one signal path. An adjustable signal-level amplification means is arranged in said signal line, which means has at least one amplifier for amplifying the transmission signals. The transmission signals are preferably those signals which the mobile radio device wishes to send to the base stations. Furthermore, (exactly) one central detection means is provided which is designed to detect the signal level associated with the transmission signals. A signal level is understood to mean an absolute value in mV or dBm, for example. A signal level is nevertheless also understood to indicate a statement as to whether or not a specific (first) threshold value is exceeded, i.e. whether or not the mobile radio band is used. The signal-level amplification means is preferably turned off when the mobile radio device does not wish to transmit any transmission signals to the base station. Depending on which mobile radio band the mobile radio device is using, the signal-level amplification means can be operated with variable amplification. In order to be able to detect the presence of a signal level for a specific mobile radio band, the mobile radio compensator comprises a decoupling means which provides at least two decoupling signal paths. Each input terminal of said decoupling signal paths is connected or coupled to the signal line. A plurality of input terminals can be combined in the process. On the other hand, each output terminal of said decoupling signal paths is connected to a power adding means which adds up the signal powers at the output of the decoupling signal paths. An output of said power adding means is in turn electrically connected to the detection means. The decoupling means further comprises a filter means arranged on or in the at least two decoupling signal paths. The passband of the filter means is in this case selected to be at least partially or completely different for each of the at least two decoupling signal paths. This means that signals having different frequencies can be applied at the output terminals of the respective decoupling signal paths. If the mobile radio device transmits at band 3 (1800 MHz range), this signal is output at an output terminal of a decoupling signal path that is different than if the mobile radio device transmits at band 7 (2500 MHz range). According to the invention, an adjustable amplification means is in this case arranged in each of the at least two decoupling signal paths. An adjustment and/or control means is present and designed to switch said amplification means on and off. The adjustment and/or control means is designed to find out, in a search and analysis state, whether a transmission signal of a mobile radio device is present and in which passband it occurs. In order to achieve this, the adjustment and/or control means is further designed to alternately switch the amplification means in one decoupling signal path and the amplification means in at least one other decoupling signal path on and off in succession such that a measurement signal that is output from the decoupling signal path of which the amplification means is switched on is applied at the output of the power adding means and can be fed to the detection means. The adjustment and/or control means is further designed to compare the measurement signal detected by the detection means with a first threshold value and, if the measurement signal reaches or exceeds the first threshold value, to actuate the signal-level amplification means such that the signal-level amplification means implements a signal amplification of the transmission signal by an adjusting factor.

The advantage thereof according to the invention is that only a detection means is used, as a result of which components can be dispensed with. A further advantage according to the invention is that switches, such as a single-pole n-throw switch (SPnT), are not used because they have only low dielectric strength. The dielectric strength amounts to approximately 20 dB. A higher dielectric strength can be achieved by using an adjustable amplification means in each of the at least two decoupling signal paths. A dielectric strength of 40, 50, or 60 dB and above is possible. As a result of the adjustment and/or control means deactivating the individual amplification means (e.g. by turning off or reducing the supply voltage), a signal is not fed at some inputs of the power adding means (because of the very high dielectric strength of the adjustable amplification means), and therefore the "added-up" signal at the output of the power adding means consists only of those input signals applied at the output of those decoupling signal paths of which the adjustable amplification means is switched on. The measurement signal signal level determined by the detection means can then be easily associated with the corresponding mobile radio band because the passbands in each decoupling signal path correspond to (exactly) one mobile radio band.

In a preferred embodiment of the mobile radio compensator, the adjustment and/or control means is further designed to adopt an idle state and, in this state, to turn on the amplification means of at least two or all of the decoupling signal paths and to compare the measurement signal detected by the detection means, which signal is in this case a summation signal, with a second threshold value. The second threshold value can in this case be selected so as to correspond to or differ from the first threshold value. The adjustment and/or control means is further designed to switch from the idle state into the search and analysis state when the detected measurement signal reaches or exceeds the second threshold value. The second threshold value is selected such that it is not exceeded when no mobile radio band is in use. As soon as the mobile radio device establishes a communication link via a mobile radio band, the measurement signal fed to the detection means, which signal corresponds to a summation signal of all the signals that are fed to the power adding means via the decoupling signal paths, will exceed a second threshold value. Only in this case are the individual decoupling signal paths connected through in succession in order to find out which mobile radio is actually in use. This occurs in the search and analysis state which is subsequently initiated.

Depending on the mobile radio standard, the mobile radio device attempts to establish the connection with the base station in such a way that said device initially transmits at the minimum transmission power and then progressively increases this power until it receives a response from the base station. The at least one second threshold value (also applies to the first threshold value if an idle state is not used), in the same way as the amplification factor in the amplification means, therefore has to be selected by at least two or all of the decoupling signal paths in such a way that a communication attempt of this kind by the mobile radio device is discovered as soon as possible. The expression "as soon as possible" can mean, for example, that a communication attempt of this kind can already be identified at a signal level of the transmission signal of greater than −50 dBm, −40 dBm, −30 dBm, −20 dBm, −10 dBm or 0 dBm.

In a preferred development, the adjustment and/or control means is designed to switch from the search and analysis state into an operating state. This happens when the detected measurement signal reaches or exceeds the first threshold value. In this case, the adjustment and/or control means is designed to leave the amplification means via which the detected measurement signal that exceeds the first threshold value is transferred switched on. The amplification means is in this case left switched on until the detected measurement signal falls back below the adjustable first threshold value or a third threshold value. For the period of time in which the corresponding amplification means is switched on, the other amplification means of the other decoupling signal paths are switched off, however.

If the measurement signal detected by the detection means falls back below the adjustable first threshold value or the third threshold value, the adjustment and/or control means is designed to switch from the operating state back into either the idle state or into the search and analysis state. In this case, a further check is performed as to whether the same or a different mobile radio band is in use. This switch-back can also take place only after a predetermined period of time for which the detected measurement signal has to fall back below the adjustable threshold value (temporal hysteresis).

The first, second and third threshold value can in this case be selected so as to be the same or different.

If the adjustment and/or control means switches the amplification means in one decoupling signal path and the amplification means in at least one other decoupling signal path on and off in succession, it is possible that, for a predetermined period of time, either no amplification means is turned on in one decoupling signal path, or that the amplification means in two decoupling signal paths are switched on simultaneously. In principle, it would also be possible in each case for exactly one amplification means in one decoupling signal path to be turned on at the same time. In the first variant, there are periods of time in which no amplification means is switched on. This can be expedient in order to save energy. If two amplification means are switched on at the same time, the measurement signal is only determined when one of said means is switched off again.

It would in principle also be possible for there to be a seamless transition between the time at which one amplification means of a signal coupling path is switched on and the time at which an amplification means of the other signal coupling path is switched on.

In principle, the adjustment and/or control means is designed to switch on the amplification means in the search and analysis state and/or in the idle state in each decoupling signal path once in regular cycles. Said means may be switched on for example once at least every 500 µs, 250 µs, 100 µs, 90 µs, 80 µs or 70 µs.

The adjustment and/or control means is also designed to switch on the amplification means for a period of longer than 1 µs, 5 µs, 10 µs, 20 µs, 50 µs, 100 µs, but also preferably for less than 100 ms, 50 ms, 1 ms, 500 µs, 250 µs, 100 µs, 75 µs, 25 µs, 15 µs, 5 µs.

As already mentioned at the outset, the passbands of the filter means correspond to different mobile radio bands. The adjusting factor by which the signal-level amplification means implements a signal amplification of the transmission signal is in this case dependent on either the size of the detected signal level of the measurement signal and/or on the decoupling signal path via which the measurement signal is fed to the detection means (i.e. on the active mobile radio band). It is possible in this case, if the measurement signal does not exceed the first threshold value, for the signal-level amplification means to operate at a reduced signal amplification or to be completely switched off. Otherwise, the signal-level amplification means can operate at a constant signal amplification, it being possible for this amplification to also be altered depending on the mobile radio band used.

The signal transmission direction of the decoupling means preferably extends from the input terminal of the decoupling signal paths to the output terminal of the decoupling signal paths. In this case the filter means is arranged, in the signal transmission direction, upstream and/or downstream of the adjustable amplification means in each decoupling signal path.

Each adjustable amplification means in each of the at least two decoupling signal paths in this case comprises at least one amplifier. Said amplifier is in particular a transistor amplifier. The adjustment and/or control means is designed to switch off or reduce the supply voltage of the at least one amplifier in the relevant decoupling signal path in order to switch off said amplifier. In addition, or alternatively, the adjustment and/or control means is designed to apply a corresponding control signal to a control terminal of the at least one amplifier (sometimes also referred to as an "enable pin") in the relevant decoupling signal path such that the at least one amplifier switches off.

The same also applies if the adjustable amplification means comprises at least two, three, four, five or more amplifiers that are arranged so as to be electrically connected in series. In principle, it would be possible for the adjustment and/or control means to be able to switch off (by reducing supply voltage or wiring a control terminal) only one of the plurality of amplifiers connected in series. The adjustment and/or control means could also do this to a plurality or all of said amplifiers, however. It is possible in this case for the amplification means in the individual decoupling signal paths to have the same or a different number of amplifiers.

The adjustment and/or control means is further designed to actuate the amplifiers connected in series (at least two amplifiers) of the relevant decoupling signal path in such a way that at least two or, if there are more than two amplifiers, a plurality of or all of said amplifiers each operate at the same or a different amplification factor when switched on.

In order to prevent interfering signals being further amplified, it is possible for at least a further component from the group of filters (in particular band-pass filters) and/or attenuators to be arranged between two amplifiers connected in series of a decoupling signal path. The attenuators can have a fixed or a variable attenuation value.

In principle, it is also possible for the adjustment and/or control means to be designed to actuate the at least one amplifier in the relevant decoupling signal path in such a way that said amplifier, when switched on, operates in each case at the same or a different amplification factor as the at least one amplifier in the at least one other decoupling signal path when that amplifier is turned on.

In general, it is also possible in this case for the amplifiers to operate at a different amplification depending on whether the search and analysis state, the idle state or the operating state is selected.

In a further embodiment of the mobile radio compensator according to the invention, the detection means comprises a comparator to which a comparison signal can also be fed in addition to the measurement signal from the output of the power adding means. The size of the comparison signal corresponds in this case to the first or second threshold value. Alternatively or in addition, the detection means can also comprise an analogue-to-digital converter that is designed to convert the measurement signal from the output of the power adding means into a digital value and to feed it to the adjustment and/or control means. In this case, the adjustment and/or control means compares this digital value with a stored first or second threshold value.

In principle, it is possible for the decoupling means, the detection means and the adjustment and/or control means to be arranged on a common printed circuit board. The individual decoupling signal paths are decoupled from one another in this case and are closed off by at least one cover.

Particularly preferably, the adjustable signal-level amplification means comprises, in addition to at least one amplifier, at least one attenuation adjuster in order to vary the amplification of the transmission signal according to the adjusting factor. The attenuation adjuster is in particular a digital attenuation means that can be actuated by the adjustment and/or control means. The digital attenuation means can activate or deactivate different attenuations depending on the control signal. The at least one amplifier of the signal-level amplification means preferably operates at a constant amplification when an attenuation adjuster is used. In this case, the signal level of the transmission signal is altered only by the at least one attenuation adjuster on the basis of the adjusting factor. It is preferably also possible to set an attenuation of 0 dB.

In principle, the adjustment and/or control means is also designed to actuate the at least one attenuation adjuster in such a way that, if the measurement signal exceeds the first threshold value, said adjuster then increases the attenuation if the measurement signal also reaches or exceeds an upper limit value or if the measurement signal reaches or falls below a lower limit value. Both the upper limit value and the lower limit value are therefore above the first threshold value. This ensures, if a mobile radio band is used, that the limit values (for the transmission power) specified by the relevant mobile radio standard are not breached. This means in particular that the upper limit value (maximum value of the transmission power) of the mobile radio standard is not exceeded, and that the lower limit value (minimum value of the transmission power) of the mobile radio standard is also reached when the base station instructs the mobile radio device to transmit at the minimum transmission power. The lower limit value is therefore above a lower limit value of the mobile radio standard. The upper limit value (maximum value of the transmission power) can be 23 dBm or 30 dBm or 33 dBm depending on the mobile radio standard used. The lower limit value (minimum value of the transmission power) can be for example −50 dBm depending on the mobile radio standard used.

The lower limit value is in this case selected such that the difference between the lower limit value and the lower limit value of the mobile radio standard is greater than the difference between the maximum and the minimum possible amplification of the signal-level amplification means that results from the minimum or maximum possible adjustment of the attenuation adjuster in conjunction with the at least one amplifier having a largely constant amplification. This ensures that the transmission signal of the mobile radio device, in conjunction with the mobile radio compensator, always reaches or falls below (short of) the lower limit value of the mobile radio standard when the base station instructs the mobile radio device to transmit at the minimum transmission power.

A difference between the lower limit value and the lower limit value of the mobile radio standard is in particular less than 70 dB, 50 dB, 40 dB, 20 dB, 10 dB or 5 dB.

The mobile radio device connection means is also connected to a first frequency separating filter. By contrast, the antenna connection means is connected to a second frequency separating filter. The frequency separating filters are preferably duplexers or a switch means. In the case of GSM signals, in particular (semiconductor) switches can also be used to separate the uplink and downlink. A first output of the first frequency separating filter is connected to the first output of the second frequency separating filter and splits the signal line into a downlink signal path, via which signals can be transmitted from the antenna connection means to the mobile radio device connection means. A second output of the first frequency separating filter is connected to the second output of the second frequency separating filter and splits the signal line into an uplink signal path, via which the transmission signals can be transmitted from the mobile radio device connection means to the antenna connection means. The adjustable signal-level amplification means is arranged at least in the uplink signal path. The input terminals of the decoupling signal paths of the decoupling means are for example connected or coupled to the signal line between the mobile radio device connection means and the first frequency separating filter, or to the signal line between the antenna connection means and the second frequency separating filter. Alternatively, the input terminals can also be connected or coupled to the uplink signal path between the first frequency separating filter and the signal-level amplification means or between the second frequency separating filter and the signal-level amplification means. The at least one attenuation adjuster can in this case be arranged in the uplink signal path between the first frequency separating filter and the signal-level amplification means (i.e. the at least one amplifier) or between the second frequency separating filter and the signal-level amplification means (i.e. the at least one amplifier). The attenuation adjuster can also be arranged in the signal line between the mobile radio device connection means and the first frequency separating filter, or between the antenna connection means and the second frequency separating filter. In the latter two cases, both the uplink signal path and the downlink signal path would extend jointly via the at least one attenuation adjuster.

It is also possible in principle for further uplink signal paths to be provided. In this case, the at least one first and the at least one second frequency separating filter would each have a third output, which are interconnected. A further uplink signal path would be formed thereby, via which transmission signals can be transmitted from the mobile radio device connection means to the antenna connection means. A further signal-level amplification means is arranged in said further uplink signal path. Said means in turn comprises at least one amplifier. The input terminals of the decoupling signal paths of the decoupling means are connected or coupled to the further uplink signal path between the first frequency separating filter and the further adjustable signal-level amplification means, or to the further uplink signal path between the second frequency separating filter and the further signal-level amplification means. In principle, it is possible for a signal-level amplification means in the uplink signal path and the further signal-level amplification means in the further uplink signal path to each contain at least one amplifier, and for a common attenuation adjuster to be used via which the two uplink signal paths and also the downlink signal path extend. The wording "that the first frequency separating filter and the second frequency separating filter each have a third signal output" is also understood to mean that both duplexers and diplexers are used. These are preferably connected in series, at least in part.

In principle, the adjustment and/or control means is designed to turn on the amplification means of at least two different decoupling signal paths simultaneously. Preferably, the amplification means of those decoupling signal paths that correspond to mobile radio bands (of which the filter means have a pass frequency for these mobile radio bands) that are used least frequently are turned on simultaneously. For this purpose, the mobile radio compensator can create a statistic itself or can access pre-set statistics. In order to create the statistic, the adjustment and/or control means can capitalise on the fact that the mobile radio device of the user or the network operator selected by the user has not changed for a prolonged period of time. In this case, some mobile radio bands are used more frequently or often, and other mobile radio bands are used less frequently or not at all. Such simultaneous turning on of amplification means of different decoupling signal paths is advantageous in that it is quicker to check non-use of specific mobile radio bands. This makes it possible to reduce the time for the cyclic through-connection of the individual decoupling signal paths.

If in the above-mentioned case the detection means nevertheless detect a signal level, this could not be definitively associated with a mobile radio band. In this case, the adjustment and/or control means is designed to alternately to turn off all the amplification means that are turned on except for the amplification means in exactly one of the at least two decoupling signal paths. This would in turn take place in the search and analysis state. The adjustment and/or control means is then designed to assign the signal level detected by the detection means to the transmission signal in the frequency range that is transmitted via the signal coupling path of which the amplification means is currently switched on. This makes it possible, in a second step, to establish with certainty which mobile radio band is used by the mobile radio device.

The motor vehicle according to the invention comprises a mobile radio compensator as described at the outset. The mobile radio device connection means is in this case electrically connected to a cradle which is located inside the motor vehicle and which is used to couple or connect the mobile radio device. The antenna connection means is in this case connected to at least one vehicle antenna which is mounted on an outer side, in particular on a roof or roof region, of the motor vehicle. An arrangement of this kind makes it possible for the mobile radio device to transmit at only a very low transmission level so that the mobile radio radiation inside the motor vehicle is low, with an optimum reception quality of the transmission signal simultaneously being ensured by the base station, and vice versa.

Various embodiments of the invention are described in the following by way of example with reference to the drawings. Like items have the same reference signs. Specifically, in the corresponding figures of the drawings.

Figure 4A:
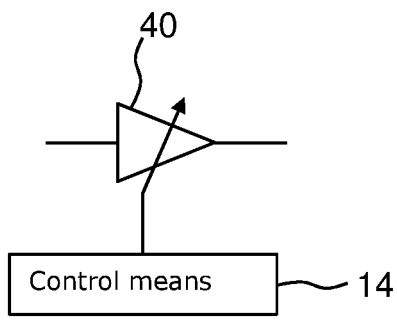
Figure 4B:
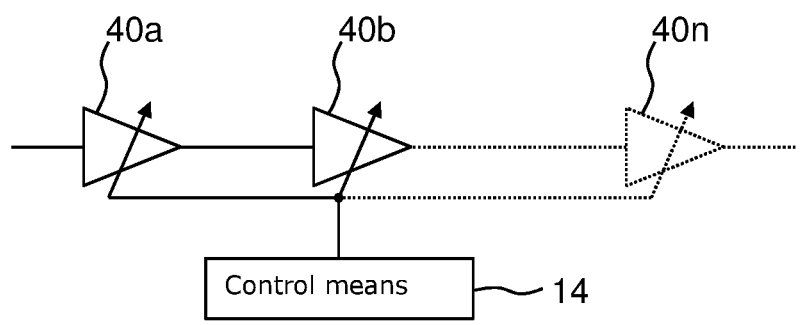
Figure 5:
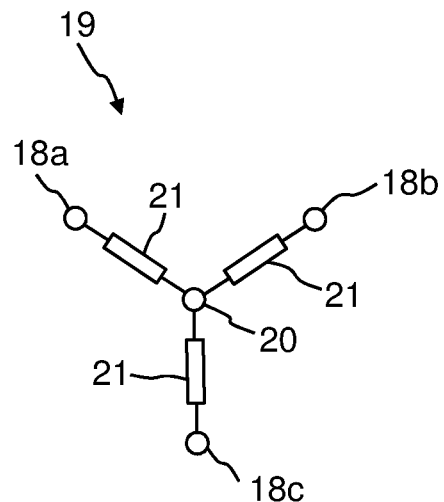

FIGS. 4A and 4B are schematic views showing that, for improved isolation in the individual decoupling signal paths, amplifiers that can be turned off are used so that the detection means is fed only a precisely determined number of transmission signals from one or a plurality of mobile radio bands at a specific time; and FIG. 5 is a schematic view showing how a simple power adding means can be constructed.

Figure 1:
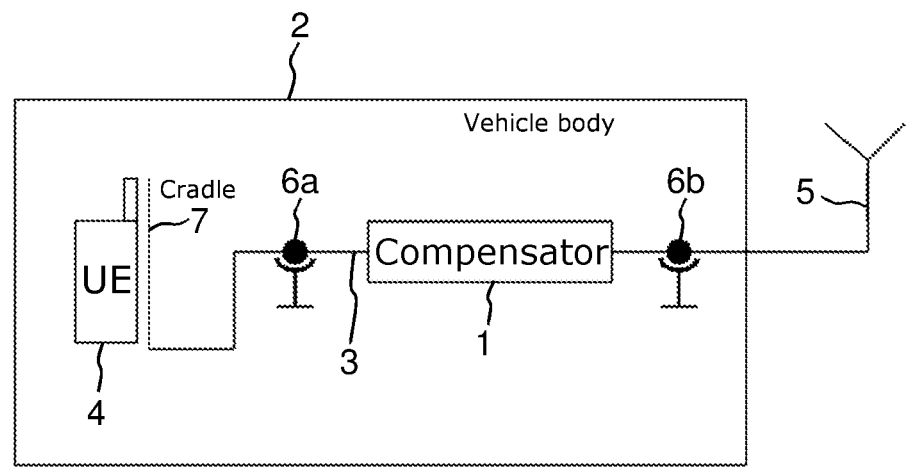
FIG. 1 is a schematic overview of a motor vehicle comprising a mobile radio compensator according to the invention which is connected to an external antenna and an inner cradle.

FIG. 1 shows the use of a mobile radio compensator 1 according the invention in a motor vehicle 2 in order to compensate for attenuation that is present on a signal line 3, for example between a mobile radio device 4 and a vehicle antenna 5.

The mobile radio compensator 1 comprises a mobile radio connection means 6a to which for example a coupling means 7 can be connected which can be designed as a cradle, for example. The mobile radio device 4 can be placed or inserted in said cradle, for example. The coupling means 7 can in this case establish signal transmission with the mobile radio device 4 in any suitable manner, for example electromagnetically, galvanically, inductively and/or capacitively.

By contrast, the mobile radio compensator 1 also comprises an antenna connection means 6b. The antenna means 5 of the motor vehicle 2, which comprises at least one vehicle antenna 5, can be connected to said antenna connection means 6b.

The signal line 3 is located between the coupling means 7 and the vehicle antenna 5.

Figure 2:
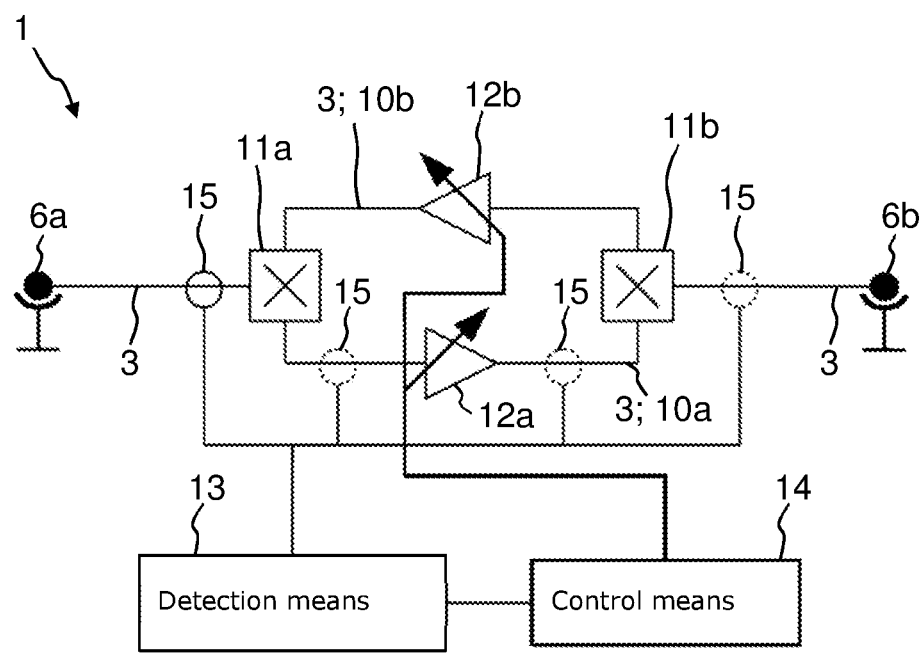
FIG. 2 is a schematic circuit diagram of the mobile radio compensator according to the invention.

FIG. 2 is a schematic view of the mobile radio compensator 1 according to the invention. As already discussed with respect to FIG. 1, the mobile radio compensator 1 comprises a mobile radio device connection means 6a and an antenna connection means 6b. The mobile radio device connection means 6a and the antenna connection means 6b are electrically, in particular galvanically, interconnected by the signal line 3, which comprises at least one signal path 10a, 10b. The mobile radio compensator 1 thereby splits the signal line 3 into an uplink signal path 10a and a downlink signal path 10b. This takes place by the use of a first frequency separating filter 11a and a second frequency separating filter 11b, which are preferably in the form of a duplexer. The mobile radio device connection means 6a is in this case electrically conductively connected to the first frequency separating filter 11a, the antenna connection means 6b being electrically conductively connected to the second frequency separating filter 11b. A first output of the first frequency separating filter 11a is electrically conductively connected to the first output of the second frequency separating filter 11b and splits the signal line 3 into the downlink signal path 10b, via which signals can be transmitted from the antenna connection means 6b to the mobile radio device connection means 6a. A second output of the first frequency separating filter 11a is electrically conductively connected to the second output of the second frequency separating filter 11b and splits the signal line 3 into the uplink signal path 10a, via which the transmission signals can be transmitted from the mobile radio device connection means 6a to the antenna connection means 6b.

An adjustable signal-level amplification means 12a is located in the uplink signal path 10a. A further signal-level amplification means 12b is located in the downlink signal path 10b. The signal-level amplification means 12a comprises at least one amplifier which is used to amplify the transmission signals. Optionally, said amplifier also comprises at least one attenuation adjuster (not shown).

The mobile radio compensator 1 according to the invention further comprises a central detection means 13 which is designed to detect the signal level of a signal on the signal line 3. In particular, the detection means 13 is designed to detect the signal level corresponding to the transmission signals (the signals transmitted by the mobile radio device 4 towards the vehicle antenna 5).

The detection means 13 is in this case connected to an adjustment and/or control means 14 which adjusts a signal amplification, produced by the signal-level amplifier 12a, 12b, of the transmission signals on the basis of the signal level and mobile radio band detected by the detection means 13. In this process, the transmission signals can be amplified to different signal levels depending on the mobile radio band used, which is assigned to different mobile radio standards.

In order for the detection means 13 to be able to detect the signal level of the transmission signal, the mobile radio compensator 1 comprises a decoupling means 15 in order to decouple part of the transmission signal for measuring the signal level and to feed it to the detection means 13.

The various points at which the decoupling means 15 can be arranged inside the mobile radio compensator 1 are indicated in FIG. 2 with dashes or with a solid line.

For instance, the decoupling means 15 can be connected or coupled to the signal line 3 between the mobile radio device connection means 6a and the first frequency separating filter 11a. The decoupling means 15 can also be connected or coupled to the signal line 3 between the antenna connection means 6b and the second frequency separating filter 11b. It would also be possible for the decoupling means 15 to be connected or coupled to the uplink signal path 10a between the first frequency separating filter 11a and the signal-level amplification means 12a. In principle, the decoupling means 15 could also be connected or coupled to the uplink signal path 10a between the second frequency separating filter 11b and the signal-level amplification means 12a.

Figure 3:
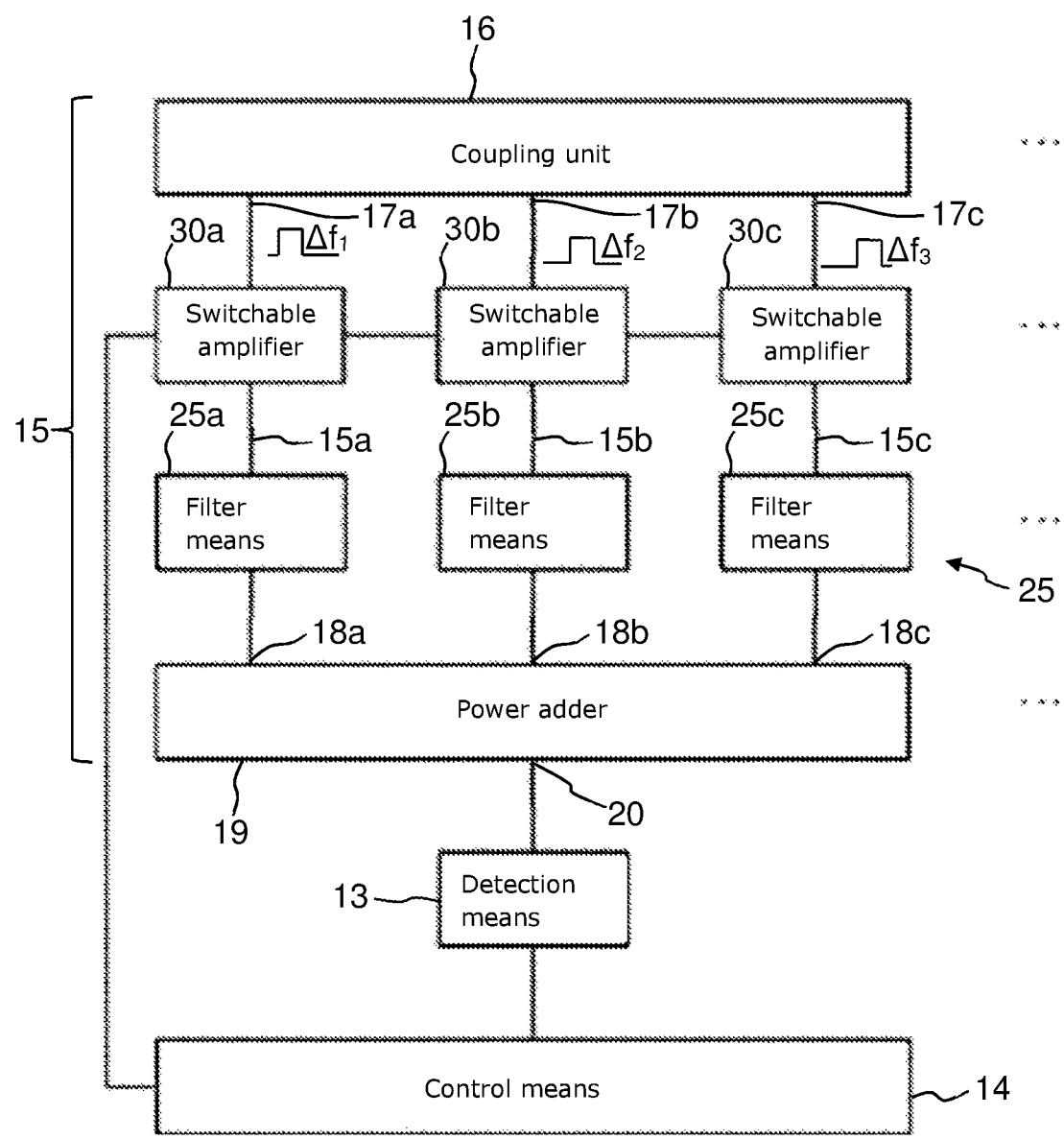
FIG. 3 is a schematic view showing that a central detection means according to the invention is used to establish which mobile radio band is currently in use.

FIG. 3 shows, in detail, the interaction of the decoupling means 15 with the detection means 13 and the adjustment and/or control means 14. The decoupling means 15 comprises at least two decoupling signal paths 15a, 15b, 15c. In the embodiment of FIG. 3, there are three decoupling signal paths 15a, 15b, 15c. There could also be four, five, six or more decoupling signal paths 15a, 15b, 15c, however. There are preferably as many decoupling signal paths 15a, 15b, 15c as there are different mobile radio bands that are intended to be amplified or supported by the mobile radio compensator 1.

The decoupling signal paths 15a, 15b, 15c stem from a coupling unit 16 which is in turn coupled or connected to the signal line 3. In the simplest case, the coupling unit 16 could consist of a conducting portion that is guided over a specific path in parallel with the signal line 3 such that the transmission signal is coupled over from the signal line 3 to the conducting portion of the coupling unit 16, the portion of the transmission signals that is coupled over into the coupling unit 16 being fed to the individual decoupling signal paths 15a, 15b, 15c. In other words, the different input terminals 17a, 17b, 17c of the decoupling signal paths 15a, 15b, 15c are connected or coupled to the signal line 3. On the other hand, the output terminals 18a, 18b, 18c of the decoupling signal paths 15a, 15b, 15c are connected to a power adding means 19. The output 20 of said power adding means 19 is connected to the detection means 13.

FIG. 5 shows an exemplary construction of a power adding means 19 of this kind which is suitable for adding up three input signals. In this embodiment, the power adding means 19 comprises three resistors 21, each of said resistors 21 being connected to the output 20 of the power adding means 19. The resistors 21 are also each connected to an output 18a, 18b, 18c of the decoupling signal paths 15a, 15b, 15c. Appropriately selecting the resistors 21 (e.g. 16⅓ ohms) makes it possible to add up the individual signals at the outputs 18a, 18b, 18c of the decoupling signal paths 15a, 15b, 15c in order to form a measurement signal, each input of the power adding means 19 representing a characteristic impedance of preferably 50 ohms, which prevents reflections back into the decoupling signal paths 15a, 15b, 15c.

Each decoupling signal path 15a, 15b, 15c preferably comprises exactly one input terminal 17a, 17b, 17c and exactly one output terminal 18a, 18b, 18c, and more preferably no branches (free of branches).

The output 20 of the power adding means 19 is fed to exactly one detection means 13. The mobile radio compensator 1 comprises in particular exactly one detection means 13, which, as explained in the following, is nevertheless sufficient in order to be able to establish the presence of a transmission signal in a specific mobile radio band.

The decoupling means 15 further comprises a filter means 25 which is arranged on or in the at least plurality of decoupling signal paths 15a, 15b, 15c and is designed such that the passbands $\Delta f_1$, $\Delta f_2$, $\Delta f_3$ for (each of the) at least two decoupling signal paths 15a, 15b, 15c differ at least in part or completely. In the embodiment of FIG. 3, part of the filter means 25 is already integrated in the coupling unit 16. This ensures that only transmission signals having different frequency ranges $\Delta f_1$, $\Delta f_2$, $\Delta f_3$ are allowed through into the respective input terminals 17a, 17b, 17c of the decoupling signal paths 15a, 15b, 15c.

The filter means 25, 25a, 25b, 25c may be a low-pass filter, a band-pass filter or a high-pass filter.

In this embodiment, the filter means 25 further comprises additional filter units 25a, 25b, 25c which are arranged directly in the respective decoupling signal paths 15a, 15b, 15c. The different passbands $\Delta f_1$, $\Delta f_2$, $\Delta f_3$ of the filter means 25, 25a, 25b, 25c for the different decoupling signal paths 15a, 15b, 15c correspond to different mobile radio bands or mobile radio standards. The individual passbands $\Delta f_1$, $\Delta f_2$, $\Delta f_3$ of the different decoupling signal paths 15a, 15b, 15c can differ from one another by less than 50 MHz, 40 MHz, 30 MHz, 25 MHz, 20 MHz, 10 MHz, 5 MHz.

According to the invention, an adjustable amplification means 30a, 30b, 30c is also arranged in each of the decoupling signal paths 15a, 15b, 15c, which means can in turn be switched on or off by the adjustment and/or control means 14. The adjustable amplification means 30a, 30b, 30c in each of the at least two decoupling signal paths 15a, 15b, 15c comprises at least one amplifier 40; 40a, 40b, . . . , 40n, in particular in the form of a transistor amplifier 40, 40a, 40b, . . . , 40n. An amplifier 40; 40a, 40b, . . . , 40n of this kind is shown in FIGS. 4A and 4B. In principle, it is possible in this case for one amplifier 40 or a plurality of amplifiers 40a, 40b, . . . , 40n to be arranged so as to be electrically connected in series in each of the decoupling signal paths 15a, 15b, 15c.

The adjustment and/or control means 14 is designed to switch off or reduce the supply voltage of the at least one amplifier 40; 40a, 40b, . . . , 40n in the relevant decoupling signal path 15a, 15b, 15c in order to switch off said amplifier. In addition, or alternatively, said means can also apply a corresponding control signal to a control terminal of the at least one amplifier 40; 40a, 40b, . . . , 40n in the relevant decoupling signal path 15a, 15b, 15c such that the at least one amplifier 40; 40a, 40b, . . . , 40n switches off.

At least one additional filter and/or attenuator is arranged between two amplifiers 40; 40a, 40b, . . . , 40n connected in series of a decoupling signal path 15a, 15b, 15c. The attenuator can also set an attenuation of 0 dB.

The individual amplifiers 40, 40a, 40b, . . . 40n of the respective amplification means 30a, 30b, 30c preferably operate at the same amplification factor when turned on. The amplification can also be selected as desired, however.

Lateral transistors are preferably used as amplifiers 40a, 40b, . . . 40n. More preferably, they are applied directly to the substrate, in particular to a printed circuit board. In the case of lateral transistors, the use of bonding wires can be omitted, as a result of which cross-coupling between different decoupling signal paths 15a, 15b, 15c can be reduced or prevented.

The adjustment and/or control means 14 is designed to switch the adjustable amplification means 30a, 30b, 30c in the at least two decoupling signal paths 15a, 15b, 15c on and off in such a way that at least one adjustable amplification means 30a, 30b, 30c in one decoupling signal path 15a, 15b, 15c is turned off such that a measurement signal that corresponds to the filtered transmission signal of the decoupling signal path 15a, 15b, 15c of which the adjustable amplification means 30a, 30b, 30c is switched on is applied at the output 20 of the power adding means 19 and can be fed to the detection means 13.

In principle, the adjustment and/or control means 14 is designed to find out, in a search and analysis state, whether a transmission signal of a mobile radio device 4 is present and in which passband $\Delta f_1$, $\Delta f_2$, $\Delta f_3$ it occurs. The adjustment and/or control means 14 is designed to alternately switch the amplification means 30a, 30b, 30c in one decoupling signal path 15a, 15b, 15c and the amplification means 30a, 30b, 30c in at least one other decoupling signal path 15a, 15b, 15c on and off in succession such that a measurement signal that is output from the (exactly one) decoupling signal path 15a, 15b, 15c of which the amplification means 30a, 30b, 30c is switched on is applied at the output 20 of the power adding means 19 and can be fed to the detection means 13.

The adjustment and/or control means 14 is further designed to compare the measurement signal detected by the detection means 13 with a first threshold value and, if the measurement signal reaches or exceeds the first threshold value, to actuate the signal-level amplification means 12a, 12b such that the signal-level amplification means 12a, 12b implements a signal amplification of the transmission signal by an adjusting factor.

In principle, the adjustable amplification means 30a, 30b, 30c in each decoupling signal path 15a, 15b, 15c is arranged upstream and/or downstream of the filter means 25, 25a, 25b, 25c.

The adjustment and/or control means 14 preferably turns the amplification means 30a, 30b, 30c in each decoupling signal path 15a, 15b, 15c on and off alternately. In particular, in each case only one amplification means 30a, 30b, 30c in a decoupling signal path 15a, 15b, 15c is turned on at the same time. As a result, it is possible for the adjustment and/or control means 14 connected to the detection means 13 to establish, on the basis of the signal level detected by the detection means 13, which mobile radio band is currently being used by the mobile radio device 4. This means that the adjustment and/or control means 14 is designed to assign the signal level detected by the detection means 13 to the transmission signal in the frequency range transmitted via the decoupling signal path 15a, 15b, 15c of which at least one amplification means 30a, 30b, 30c (and thus at least one amplifier 40a, 40b, . . . , 40n thereof) is switched on.

The adjustment and/or control means 14 is further designed, in an idle state, to switch on the amplification means 30a, 30b, 30c of at least two or all of the decoupling signal paths 15a, 15b, 15c and to compare the measurement signal detected by the detection means 13 with a second threshold value. The adjustment and/or control means 14 is then designed to switch from the idle state into the search and analysis state if the detected measurement signal reaches or exceeds the second threshold value.

The adjustment and/or control means 14 is also designed to switch from the search and analysis state into an operating state when the detected measurement signal reaches or exceeds the first threshold value. The adjustment and/or control means 14 is designed, in the operating state, to leave the amplification means 30a, 30b, 30c in which the measurement signal detected by the detection means 13 reaches or exceeds the adjustable first threshold value switched on until the detected measurement signal falls back below the adjustable first threshold value or a third threshold value, the adjustment and/or control means 14 being further designed to leave the other amplification means 30a, 30b, 30c of the other decoupling signal paths 15a, 15b, 15c switched off during this time.

The adjustment and/or control means 14 is designed, if the measurement signal detected by the detection means 13 falls back below the adjustable first threshold value or the third threshold value, or does so for a predetermined period of time, to switch from the operating state back into the idle state or into the search and analysis state. The predetermined period of time is more than 10 ms, 50 ms, 100 ms, 200 ms, 400 ms, 800 ms, 1200 ms, 2 s, 4 s, 8 s or more than 10 s, and preferably less than 20 s, 15 s, 12 s, 9 s, 7 s, 5 s, 3 s or less than 1 s. The first and the third threshold value can in this case be selected so as to be identical or different.

Advantageously, the adjustment and/or control means 14 and in particular the detection means 13 is designed to check the decoupling signal paths 15a, 15b, 15c in regular cycles to ascertain whether the mobile radio device in the corresponding mobile radio band wishes to transmit a transmission signal. Preferably all mobile radio bands, i.e. all the decoupling signal paths 15a, 15b, 15c, can be checked for the presence of a signal level once in regular cycles of preferably less than 100 µs, 90 µs, 80 µs or 70 µs. In particular, a check of this kind of all the decoupling signal paths 15a, 15b, 15c is possible in a period of time which corresponds to the length of a GSM slot or is shorter than the length of a GSM slot.

The detection means 13 preferably comprises a comparator to which a comparison signal (first threshold value or second threshold value) is also fed in addition to the measurement signal from the output 20 of the power adding means 19. Once the measurement signal from the output 20 of the power adding means 19 is greater than the comparison signal, the adjustment and/or control means 14 assumes that the mobile radio device 4 in one mobile radio band wishes to transmit a transmission signal, and determines the corresponding mobile radio band. The detection means 13 could also comprise an A/D converter that is designed to convert the measurement signal at the output 20 of the power adding means 19 into a digital value and to feed it to the adjustment and/or control means 14. An A/D converter of this kind could also be arranged at the output of the comparator.

The decoupling means 15, the detection means 13 and the adjustment and/or control means 14 are preferably arranged on a common printed circuit board. The individual decoupling signal paths 15a, 15b, 15c are preferably decoupled from one another. This can occur by the individual decoupling signal paths 15a, 15b, 15c being separated from one another by a plurality of feedthroughs, an additional cover having individual walls that come to rest on the feedthroughs closing off the decoupling means 15 on the printed circuit board. On account of the fact that the adjustable amplification means 30a, 30b, 30c has a very high dielectric strength of at least 30 dB, 40 dB, 50 dB or more than 60 dB, a high dielectric strength can be achieved in a very cost-effective manner compared with the use of switches. This makes it possible to connect a plurality of decoupling signal paths 15a, 15b, 15c at different inputs of a power adding means 19, the output 20 of said power adding means 19 being fed to a single detection means 13. On account of the fact that only a single detection means (comprising a single detection unit or a single detection element) is used, it is possible to check which mobile radio bands are used by the mobile radio device 4 in a very cost-effective and reliable manner. This means that the mobile radio compensator 1 can optimally adjust the corresponding adjustable signal-level amplification means 12a, 12b or operate said means within the permitted limit values for each mobile radio band or mobile radio standard.

As mentioned at the outset, the adjustable signal-level amplification means 12a, 12b comprises, in addition to the at least one amplifier, at least one attenuation adjuster in order to vary the amplification of the transmission signal according to the adjusting factor. The at least one amplifier of the signal-level amplification means 12a, 12b operates at a constant amplification, the at least one attenuation adjuster being designed to attenuate the transmission signal on the basis of the adjusting factor. The attenuation adjuster also ensures that the mobile radio compensator 1 does not output any transmission signals of which the signal level is higher than the maximum signal level permitted by the relevant mobile radio standard.

The attenuation adjuster can in this case be arranged in the uplink signal path 10a. Both the uplink signal path 10a and the downlink signal path can also extend jointly via the attenuation adjuster.

The mobile radio compensator 1 can support one or more mobile radio standards, such as GSM, UMTS and/or LTE.

The invention is not limited to the embodiments described. Within the scope of the invention, all the features described and/or illustrated can be combined with one another as desired.

The invention claimed is:

1. Mobile radio compensator for use in motor vehicles in order to compensate for signal attenuation when transmitting transmission signals of a mobile radio device, comprising:
   a mobile radio device connection and an antenna connection, wherein the mobile radio device can be connected or coupled to the mobile radio compensator by means of the mobile radio device connection, and wherein an antenna can be connected to the antenna connection;
   the mobile radio device connection and the antenna connection are electrically interconnected by a signal line which comprises at least one signal path;
   an adjustable signal-level amplifier is arranged in the signal line, and has at least one amplifier for amplifying the transmission signal;
   a central detector which is designed to detect a signal level associated with the transmission signal;
   a decoupler comprising at least two decoupling signal paths is provided, wherein each input terminal of said decoupling signal paths of the decoupler is connected or coupled to the signal line, and wherein each output terminal of said decoupling signal paths is connected to a power adder of which the output is in turn connected to the detector;
   the decoupler comprises a filter which is arranged on or in the at least two decoupling signal paths, wherein the passbands of the filter for at least two decoupling signal paths are selected so as to differ at least in part or completely;
   an adjustable amplifier is arranged in each of the at least two decoupling signal paths;
   an adjustment and/or controller is provided which is designed, in a search and analysis state, to find out whether a transmission signal of a mobile radio device is present and in which passband said signal occurs, wherein the adjustment and/or controller is designed, for this purpose, to alternately switch the amplifier in one decoupling signal path and the amplifier in at least one other decoupling signal path on and off in succession such that a measurement signal that is output from the decoupling signal path of which the amplifier is switched on is applied at the output of the power adder and can be fed to the detector;
   the adjustment and/or controller is further designed to compare the measurement signal detected by the detector with a first threshold value and, if the measurement signal reaches or exceeds the first threshold value, to actuate the signal-level amplifier such that the signal-level amplifier implements a signal amplification of the transmission signal by an adjusting factor.

2. Mobile radio compensator according to claim 1, wherein:
   the adjustment and/or controller is further designed, in an idle state, to switch on the amplifier of at least two or all of the decoupling signal paths and to compare the measurement signal detected by the detector with a second threshold value;
   the adjustment and/or controller is further designed to switch from the idle state into the search and analysis state if the detected measurement signal reaches or exceeds the second threshold value.

3. Mobile radio compensator according to claim 2, wherein:
   the adjustment and/or controller is designed, if the measurement signal detected by the detector falls back below the adjustable first threshold value or the third threshold value, to switch from the operating state back into the idle state or into the search and analysis state.

4. Mobile radio compensator according to claim 3, wherein:
   the adjustment and/or controller is designed, if the measurement signal detected by the detector falls back below the adjustable first threshold value for a predetermined period of time, to switch from the operating state back into the idle state or into the search and analysis state.

5. Mobile radio compensator according to claim 4, wherein:
the predetermined period of time is more than 10 ms, 50 ms, 100 ms, 200 ms, 400 ms, 800 ms, 1200 ms, 2 s, 4 s, 8 s, 10 s, and less than 20 s, 15 s, 12 s, 9 s, 7 s, 5 s, 3 s, 1 s.

6. Mobile radio compensator according to either claim 1, wherein:
the adjustment and/or controller is designed to switch from the search and analysis state into an operating state when the detected measurement signal reaches or exceeds the first threshold value;
the adjustment and/or controller is designed, in the operating state, to leave the amplifier in which the measurement signal detected by the detector reaches or exceeds the adjustable first threshold value switched on until the detected measurement signal falls back below the adjustable first threshold value or a third threshold value, the adjustment and/or controller being further designed to leave the other amplifier of the other decoupling signal paths switched off during this time.

7. Mobile radio compensator according to claim 1, wherein:
the adjustment and/or controller is designed to alternately switch the amplifier in one decoupling signal path and the amplifier in at least one other decoupling signal path on and off in succession such that, for a predetermined period of time:
a) no amplifier in a decoupling signal path is switched on; or
b) the amplifier in two decoupling signal paths are switched on simultaneously; or
c) the amplifier in exactly one decoupling signal path is switched on.

8. Mobile radio compensator according to claim 1, wherein:
the adjustment and/or controller is designed to switch on the amplifier in the search and analysis state and/or in the idle state in each decoupling signal path once in regular cycles, in particular at least every 100 µs, 90 µs, 80 µs or 70 µs.

9. Mobile radio compensator according to claim 8, wherein:
the adjustment and/or controller is designed to switch on the amplifier for a period of longer than 1 µs, 5 µs, 10 µs, 20 µs, 50 µs or 100 µs, but also for less than 100 ms, 50 ms, 1 ms, 500 µs, 250 µs, 100 µs, 75 µs, 25 µs, 15 µs or 5 µs.

10. Mobile radio compensator according to claim 1, wherein:
the passbands of the filter correspond to different mobile radio bands;
the adjusting factor by which the signal-level amplifier implements a signal amplification of the transmission signal is dependent on:
a) the size of the detected signal level of the measurement signal; and/or
b) the decoupling signal path via which the measurement signal is fed to the detector.

11. Mobile radio compensator according to claim 1, wherein:
a signal transmission direction of the decoupler extends from the input terminal of the decoupling signal paths to the output terminal of the decoupling signal paths;
the filter is arranged in each decoupling signal path upstream and/or downstream of the adjustable amplifier in the signal transmission direction.

12. Mobile radio compensator according to claim 1, wherein:
the adjustable amplifier in each of the at least two decoupling signal paths comprises at least one amplifier;
the adjustment and/or controller is designed:
a) to switch off or reduce the supply voltage of the at least one amplifier in the relevant decoupling signal path in order to switch off said amplifier; and/or
b) to apply a corresponding control signal to a control terminal of the at least one amplifier in the relevant decoupling signal path such that the at least one amplifier switches off.

13. Mobile radio compensator according to claim 12, wherein:
at least two, three, four, five or more amplifiers are arranged to as to be electrically connected in series in one, a plurality, or all of the two, three, four or at least five decoupling signal paths;
the adjustment and/or controller is designed:
a) to switch off or reduce the supply voltage of one, a plurality, or all of the amplifiers connected in series of the relevant decoupling signal path in order to switch off said amplifier(s); and/or
b) to apply a corresponding control signal to a control terminal of one, a plurality, or all of the amplifiers connected in series of the relevant decoupling signal path in order to switch off said amplifier(s).

14. Mobile radio compensator according to claim 13, wherein:
the adjustment and/or controller is designed to actuate the amplifiers connected in series of the relevant decoupling signal path in such a way that at least two or all of said amplifiers each operate at the same or a different amplification factor when switched on.

15. Mobile radio compensator according to claim 13, wherein:
at least one further component is arranged between two amplifiers connected in series of a decoupling signal path, which component is selected from the group of:
a) filters; and/or
b) attenuators.

16. Mobile radio compensator according to claim 12, wherein:
the adjustment and/or controller is designed to actuate the at least one amplifier in the relevant decoupling signal path in such a way that said amplifier, when switched on, operates in each case at the same or a different amplification factor as the at least one amplifier in the at least one other decoupling signal path when that amplifier is turned on.

17. Mobile radio compensator according to claim 12, wherein:
the at least one amplifier in each of the at least two decoupling signal paths is a transistor amplifier.

18. Mobile radio compensator according to claim 1, wherein:
the detector comprises a comparator to which a comparison signal can also be fed in addition to the measurement signal from the output of the power adder; or
the detector comprises an analogue-to-digital converter that is designed to convert the measurement signal from the output of the power adder into a digital value and to feed it to the adjustment and/or controller.

19. Mobile radio compensator according to claim 1, wherein:
the decoupler, the detector and the adjustment and/or controller are arranged on a common printed circuit board, the individual decoupling signal paths being decoupled from one another and preferably closed off by at least one cover.

20. Mobile radio compensator according to claim 1, wherein:
the adjustable signal-level amplifier comprises, in addition to the at least one amplifier, at least one attenuation adjuster in order to vary the amplification of the transmission signal according to the adjusting factor.

21. Mobile radio compensator according to claim 20, wherein:
the at least one amplifier of the signal-level amplifier operates at a constant amplification, the at least one attenuation adjuster being designed to attenuate the transmission signal on the basis of the adjusting factor.

22. Mobile radio compensator according to claim 21, wherein:
the adjustment and/or controller is designed to actuate the at least one attenuation adjuster in such a way that, if the measurement signal exceeds the first threshold value, said adjuster then increases the attenuation if the measurement signal also
a) reaches or exceeds an upper limit value; or
b) reaches or falls below a lower limit value,
both the upper limit value and the lower limit value being above the first threshold value.

23. Mobile radio compensator according to claim 22, wherein:
the upper limit value is specified by a mobile radio standard in which the mobile radio device can be operated and is 23 dBm or 30 dBm; or
the upper limit value is below an upper limit value specified by the mobile radio standard for the maximum transmission power, the upper limit value of the mobile radio standard being e.g. 23 dBm or 30 dBm; and/or
the lower limit value is above a lower limit value of the mobile radio standard that the mobile radio device has to reach or be below when said device is instructed by a base station to transmit at the minimum transmission power, the lower limit value of the mobile radio standard being −50 dBm.

24. Mobile radio compensator according to claim 23, wherein:
the lower limit value is selected such that the difference between the lower limit value and the lower limit value of the mobile radio standard is greater than the difference between the maximum and the minimum possible amplification of the signal-level amplifier that results from the minimum or maximum possible adjustment of the attenuation adjuster in conjunction with the at least one amplifier having a largely constant amplification.

25. Mobile radio compensator according to claim 23, wherein:
a difference between the lower limit value and the lower limit value of the mobile radio standard is less than 50 dB, 40 dB, 30 dB, 20 dB, 10 dB or 5 dB.

26. Mobile radio compensator according to claim 20, wherein:
the at least one attenuation adjuster is arranged in:
a) the signal line between the mobile radio device connection and the first frequency separating filter; and/or
b) the signal line between the antenna connection and the second frequency separating filter; and/or
c) the uplink signal path between the first frequency separating filter and the signal-level amplifier; and/or
d) the uplink signal path between the second frequency separating filter and the signal-level amplifier.

27. Mobile radio compensator according to claim 1, wherein:
the mobile radio device connection is connected to a first frequency separating filter, in particular to a first duplexer or a first switch;
the antenna connection is connected to a second frequency separating filter, in particular to a second duplexer or a second switch;
a first output of the first frequency separating filter is connected to the first output of the second frequency separating filter and splits the signal line into a downlink signal path, via which signals can be transmitted from the antenna connection to the mobile radio device connection;
a second output of the first frequency separating filter is connected to the second output of the second frequency separating filter and splits the signal line into an uplink signal path, via which the transmission signals can be transmitted from the mobile radio device connection to the antenna connection;
the adjustable signal-level amplifier is arranged at least in the uplink signal path;
the input terminals of the decoupling signal paths of the decoupler are:
a) connected or coupled to the signal line between the mobile radio device connection and the first frequency separating filter; or
b) connected or coupled to the signal line between the antenna connection and the second frequency separating filter; or
c) connected or coupled to the uplink signal path between the first frequency separating filter and the signal-level amplifier; or
d) connected or coupled to the uplink signal path between the second frequency separating filter and the signal-level amplifier.

28. Mobile radio compensator according to either claim 27, wherein:
at least a third output of the first frequency separating filter is connected to at least a third output of the second frequency separating filter and splits the signal line into a further uplink signal path, via which the transmission signals can be transmitted from the mobile radio device connection to the antenna connection;
a further adjustable signal-level amplifier is arranged in the further uplink signal path;
the input terminals of the decoupling signal paths of the decoupler are:
a) connected or coupled to the further uplink signal path between the first frequency separating filter and the further adjustable signal-level amplifier; or
b) connected or coupled to the further uplink signal path between the second frequency separating filter and the further signal-level amplifier.

29. Motor vehicle comprising a mobile radio compensator which is designed according to claim 1, wherein:
the mobile radio device connection is electrically connected to a cradle which is located inside the motor vehicle and which is used to couple or connect a mobile radio device;

the antenna connection is electrically connected to at least one vehicle antenna which is arranged on an outer side, in particular on a roof, of the motor vehicle.

* * * * *